(12) United States Patent
Tribble

(10) Patent No.: US 8,949,971 B2
(45) Date of Patent: *Feb. 3, 2015

(54) SYSTEM AND METHOD FOR STORING A PASSWORD RECOVERY SECRET

(71) Applicant: Apple Inc., Cupertino, CA (US)

(72) Inventor: Guy Leslie Tribble, Hillsborough, CA (US)

(*) Notice: Subject to any disclaimer, the term of this patent is extended or adjusted under 35 U.S.C. 154(b) by 97 days.

This patent is subject to a terminal disclaimer.

(21) Appl. No.: 13/763,419

(22) Filed: Feb. 8, 2013

(65) Prior Publication Data

US 2013/0219489 A1  Aug. 22, 2013

Related U.S. Application Data

(63) Continuation of application No. 12/828,497, filed on Jul. 1, 2010, now Pat. No. 8,429,760.

(51) Int. Cl.
H04L 29/06 (2006.01)
G06F 21/45 (2013.01)
G06F 21/34 (2013.01)
(Continued)

(52) U.S. Cl.
CPC .............. G06F 21/45 (2013.01); G06F 21/34 (2013.01); G06F 21/81 (2013.01); G06F 21/32 (2013.01); G06F 2221/2131 (2013.01)
USPC .......................................................... 726/18

(58) Field of Classification Search
CPC .................................................... G06F 21/45
USPC .......................................................... 726/18
See application file for complete search history.

(56) References Cited

U.S. PATENT DOCUMENTS 6,012,145 A  1/2000 Mathers et al.
7,240,037 B1 * 7/2007 Bussell ........................... 705/75
(Continued)

FOREIGN PATENT DOCUMENTS

CN  2831235  10/2006
CN  1885226  12/2006
EP  1737156  12/2006

OTHER PUBLICATIONS

Australian Patent Application No. 2011274360—Patent Examination Report No. 1 dated Oct. 29, 2013.
(Continued)

*Primary Examiner* — Michael S McNally
(74) *Attorney, Agent, or Firm* — Womble Carlyle Sandridge & Rice, LLP

(57) ABSTRACT

Disclosed herein are systems, methods, and non-transitory computer-readable storage media for storing a password recovery secret on a peripheral such as a power adapter by receiving a password recovery secret at the power adapter via an interface with the computing device, and storing the password recovery secret on a memory in the power adapter. The password recovery secret can be recovered by requesting the password recovery secret from the power adapter, wherein the password recovery secret is associated with a computing device, receiving the password recovery secret from the memory of the power adapter, and recovering a password based on the password recovery secret. The power adapter can include an electrical source interface, an electronic device interface, an intermediate module to adapt electricity between the interfaces, a memory, and a memory interface through which a password recovery secret is received for storage in the memory.

17 Claims, 8 Drawing Sheets

(51) Int. Cl.
   *G06F 21/81*     (2013.01)
   *G06F 21/32*     (2013.01)

(56) References Cited

U.S. PATENT DOCUMENTS

| | | | |
|---|---|---|---|
| 7,251,632 B1* | 7/2007 | Ogg et al. | 705/62 |
| 2002/0052841 A1* | 5/2002 | Guthrie et al. | 705/40 |
| 2003/0182584 A1 | 9/2003 | Banes et al. | |
| 2003/0185398 A1 | 10/2003 | Hypponnen | |
| 2004/0128251 A1 | 7/2004 | Adam et al. | |
| 2004/0133812 A1* | 7/2004 | Ohmori et al. | 713/202 |
| 2006/0211407 A1 | 9/2006 | Lai et al. | |
| 2007/0088952 A1 | 4/2007 | Hewitt et al. | |
| 2007/0094739 A1 | 4/2007 | Wu | |
| 2011/0191838 A1* | 8/2011 | Yanagihara | 726/7 |

OTHER PUBLICATIONS

PCT/US2011/042833. Int'l Search Report & Written Opinion (Sep. 7, 2011).

Pogue et al., "Windows XP Professional: The Missing Manual. 1st Ed. pp. 26, 59, 497-534, 563-611." (Jan. 1, 2003).

Korean Patent Application No. 10-2013-7002675—Office Action dated Feb. 27, 2014.

Taiwanese Patent Application No. 100123454—Office Action dated Mar. 7, 2014.

* cited by examiner

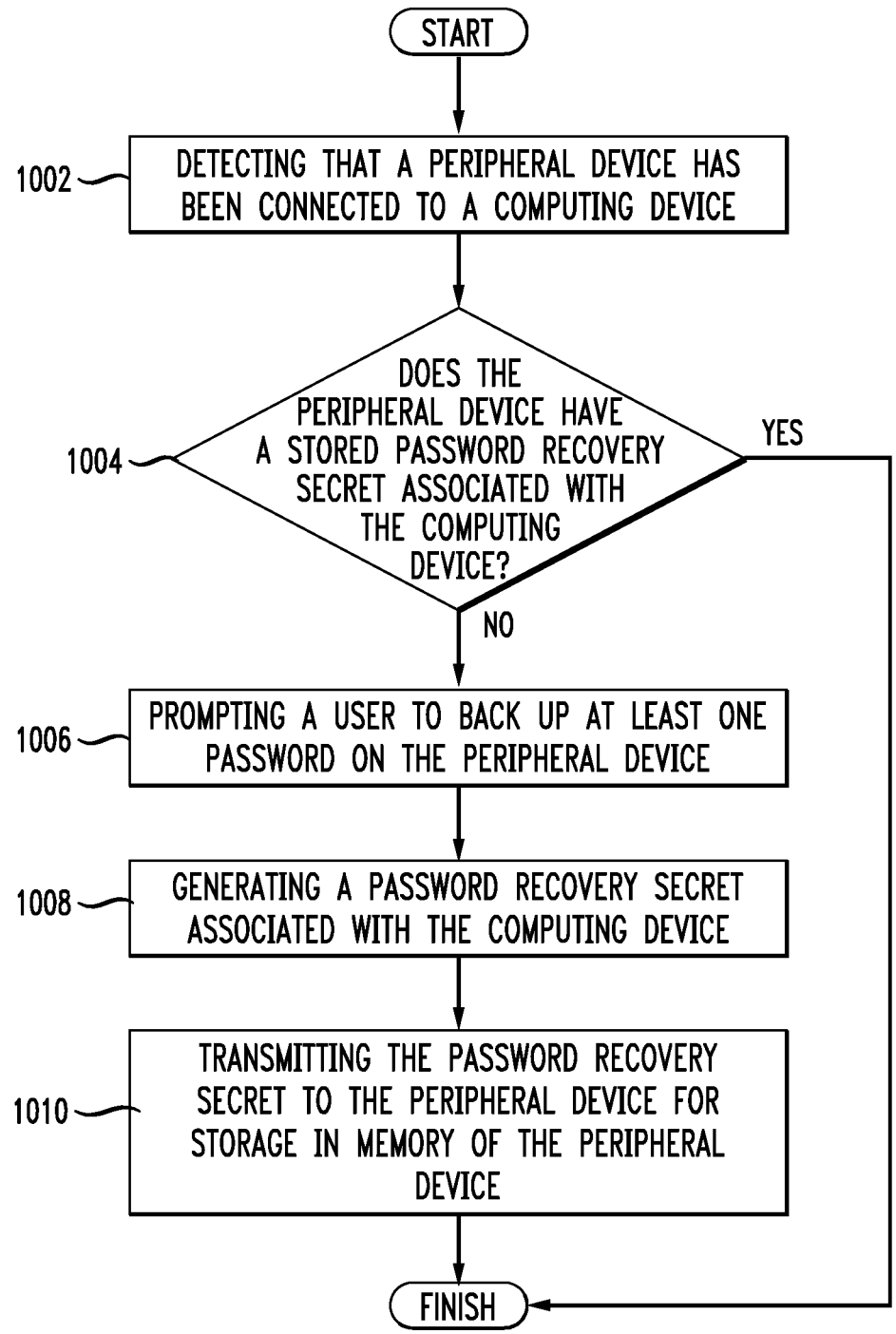

SYSTEM AND METHOD FOR STORING A PASSWORD RECOVERY SECRET

CROSS-REFERENCE TO RELATED APPLICATIONS

This application is a continuation of U.S. patent application Ser. No. 12/828,497, filed Jul. 1, 2010, which is incorporated herein by reference in its entirety and for all purposes.

BACKGROUND

1. Technical Field

The present disclosure relates to passwords and more specifically to storing and recovering passwords in a common peripheral.

2. Introduction

Computing devices, such as desktop computers, laptop computers, smartphones, PDAs, and so forth, include security measures requiring a user to enter credentials, such as a username and password, to obtain access to the computing device. However, it is inevitable that at least one user will forget their username and/or password. One approach to recovering this information is to log in as an administrator to reset the password, but this approach often fails because the user typically forgets the administrator credentials or forgets that the administrator account even exists. Another approach is to prompt the user to enter a password recovery phrase, such as "what is your mother's maiden name?" However, users typically enter this information once during account creation and often forget what they entered as the password recovery phrase. Yet another approach relies on biometrics, but this approach is not useful when the user is not nearby the computer or when the user dies, for example.

Many users view the above approaches as too inconvenient, especially if they involve a system administrator. The result is that the user chooses not to use a password or uses a trivial password, such as a short password or an easily guessable password. Especially in the case of portable computing devices, this presents a security risk if an opportunistic thief steals the device. Although it can be difficult to provide both convenient password recovery and security in all use scenarios, one increasingly important scenario involves protecting a portable computing device when a user carries the device separately from a commonly associated peripheral device. If this particular use scenario can be protected and password recovery can be provided in a convenient way, then the user is more likely to use a password, and protection will be increased.

Accordingly, what is needed in the art is an improved way to recover lost or forgotten electronic credentials, while still protecting the computing device in the common case when it is not with its associated peripheral device.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein is an approach which stores a credential recovery secret associated with a computing device on a peripheral or companion device. One of the threat models which this approach addresses is that in which an opportunistic thief steals a portable device while the user is "out and about"—that is, the device is being carried by the user and is physically separate from its associated peripheral or companion device. One example is a student that takes her laptop computer to a university class, but leaves the docking station in her dorm room. Another example is an employee that takes his portable media player to work, but leaves the power cord in a locker.

Although there are other threat models that are not directly addressed by this method, this is an important one for portable consumer devices. If the password is not easily and conveniently recoverable, the consumer is likely to choose either not to use a password at all or to use a trivial password. Both of these choices can increase the threat of data loss.

In one aspect, the peripheral or companion device should be something that users are already familiar with and use on a regular basis, such as a power adapter, printer, portable hard drive, wired or wireless network router, backup device, flash drive, a smartphone, a mobile device, a remote control, and an external monitor.

In one implementation, the recovery secret is data which is meaningless without the use of some companion data on the associated computer to understand and/or complement the recovery secret. The credential recovery secret can consist, for example, of the password encrypted with a large randomly generated universal unique identifier (UUID) associated with and stored on the computing device. Part of the credential recovery secret can be stored on the peripheral or companion device and part can be stored on a network accessible server. In one aspect, the credentials can be recovered via a combination of parts from the peripheral and the network accessible server. In the case of storing the credential recovery secret on a power adapter, the power adapter can provide power and a data connection to store and retrieve the credential recovery secret via a same physical connector.

In one variation, the system generates the recovery secret by encrypting the password using the UUID as the key. The system then stores the encrypted password, which is the credential recovery secret, on the peripheral device, and stores the UUID on the computing device. In this way, when the peripheral device is attached, the system can retrieve the encrypted password, and decrypt the password on the computing device using the UUID as the key. Because the computing device only has the UUID, the computing device cannot recover the password by itself, and because the peripheral device only has the encrypted password, the peripheral device cannot recover the password by itself. Further, the UUID can be a sufficiently large number of bits, such as 128 or 1024 bits, so that a brute force attack is not able to easily discover the UUID. However, when the peripheral device is connected to the computing device, the computing device has access to both the UUID and the encrypted password, and can recover the password by decrypting with the UUID as key. The password recovery approaches disclosed herein can be used in conjunction with other password recovery approaches, so that a user has a choice or option of more than one way to recover a lost password.

Disclosed are systems, methods, and non-transitory computer-readable storage media for storing a password recovery secret on a power adapter by receiving a password recovery secret associated with the computing device at an electrical power adapter via an interface with the computing device, and storing the password recovery secret on a memory in the electrical power adapter. Also disclosed are systems, methods, and non-transitory computer-readable storage media for recovering a password with a password recovery secret stored on a power adapter by requesting from the power adapter a password recovery secret stored in a memory of the power adapter, receiving the password recovery secret from the memory of the power adapter, and recovering a password based on the password recovery secret.

Further, the computing device can prompt a user to store a password recovery secret on a peripheral device by detecting that a peripheral device has been connected to the computing device, and determining whether the peripheral device has a stored password recovery secret associated with the computing device. If not, the computing device prompts the user to back up at least one password on the peripheral device, generates a password recovery secret associated with the computing device, and transmits the password recovery secret to the peripheral device for storage in the memory of the peripheral device.

The peripheral or companion device can be a power adapter that stores a password or credential recovery secret and can include a first interface configured to connect to an electrical source, a second interface configured to connect to an electronic device, an intermediate module to adapt electricity from the electrical source for the electronic device, a memory, and a third interface connected to the memory through which a password recovery secret associated with the electronic device is received for storage in the memory.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 10 illustrates a third example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
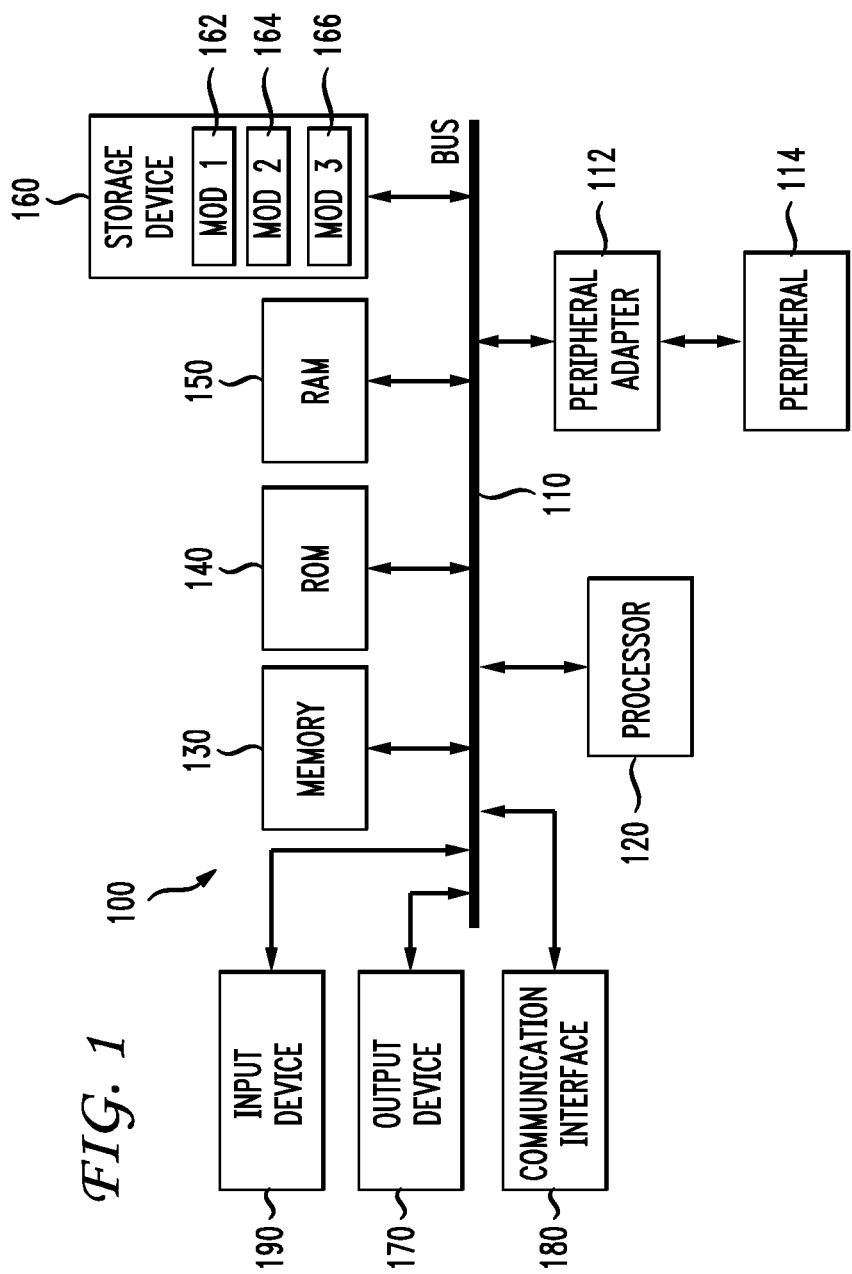
FIG. 1 illustrates an example system embodiment.

The present disclosure addresses the need in the art to enable recovery of electronic credentials. One exemplary threat model which this approach addresses is the threat of theft while a user is carrying or using a portable device, all or part of which is protected by the electronic credentials, on the go. In this usage scenario, the portable device and its associated peripheral or companion device(s) are not in the same location. One example of this scenario is an executive that that takes his smartphone to client meetings, but leaves the charging cable in the office. Other use scenarios also exist. Systems, methods and non-transitory computer-readable storage media are disclosed which store password recovery secrets, recover password recovery secrets, and prompt a user to store a password recovery secret. Also disclosed is an exemplary power adapter peripheral for storing all or part of a credential recovery secret. Although the examples and discussion in the disclosure are directed to a power adapter, other peripherals can be substituted as well, such as a printer, portable hard drive, docking station, wired or wireless network router, backup device, flash drive, a smartphone, a mobile device, a remote control, and an external monitor. Multiple peripherals can operate in conjunction or simultaneously. A brief introductory description of a basic general purpose system or computing device in FIG. 1 is disclosed herein which can be employed to practice all or part of the concepts, followed by more detailed discussion of the methods, hardware, and graphical interfaces. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

A peripheral adapter 112 can provide an interface for one or more peripheral 114 to communicate with other components, such as the processor 120, storage device 160, and communication interface 180, via the bus 110. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some basic system components, the disclosure now turns to an example usage scenario. A student brings her laptop to study in the public library for an hour between classes. Because the expected study time is only one hour, she does not bring the laptop power adapter. The student opens the laptop and sets up study materials in what she assumes is a safe corner of the library. She leaves the laptop unattended for a few moments to ask the librarian a question. When she returns the laptop is gone. A thief has stolen the laptop without the power adapter. The thief charges the stolen laptop with a different power adapter, but when the thief tries to retrieve the password from the laptop while connected to the different power adapter, the password recovery process disclosed herein is futile and does not yield the password. A discussion of the various embodiments for implementing this protection follows.

Figure 2:
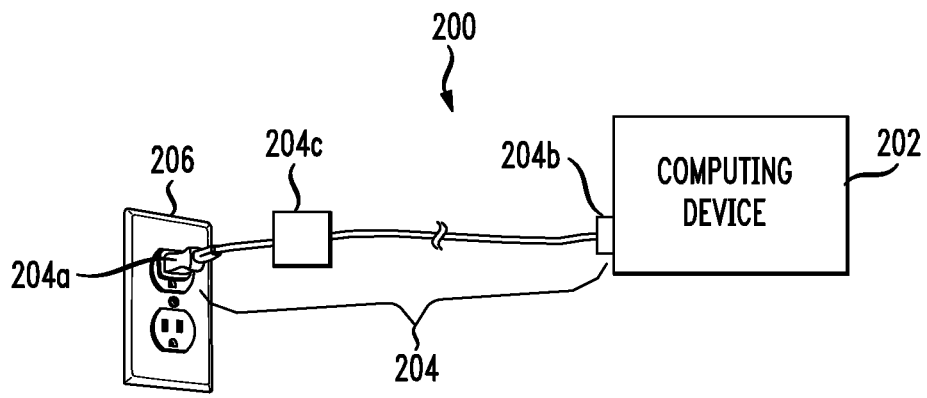
FIG. 2 illustrates an example computer and power adapter.

While the peripheral or companion device can include many other single or multiple devices, the disclosure now turns to the combination 200 of an example computing device 202 and a power adapter 204 as a single peripheral device as illustrated in FIG. 2. A laptop computer is one example computing device 202, but 202 can be any computing device that allows access to one or more resource based on credentials, such as a desktop computer, an all-in-one computing device, a smartphone, a tablet computer, a smartphone, a portable media player, a netbook, a thin client, and so forth. Virtually every such computing device requires a link to a power source 206, and some include internal and/or external batteries which, when charged, provide for mobile use of the computer 202. One such link is a power adapter 204 which includes a power transformer 204c, a pair of electrical interfaces 204a, 204b between a power source 206 and the computer 202, as well as a data connection with the computer 202 to establish and retrieve a password recovery secret. The power transformer 204c can, for example, transform alternating current to direct current, or adjust the amperage of an electric current to meet the needs of an electronic device. One reason for storing a password recovery secret in a power adapter is that users are already accustomed to using power adapters. Including this extended functionality has effectively zero resistance to consumer adoption because it does not change established consumer behavior.

The peripheral can store more than one password, for more than one user, and for more than one computer. The peripheral can store system passwords, website logins, other individual keys (such as PGP keys), and/or all or part of a keychain. In one aspect, each peripheral in a group of peripherals stores a different aspect of the system. For example, a power adapter can store the system login credentials, a docking station can store file system encryption data, a home network router can store a keychain, and so forth. When the user attempts to recover the password, the system can prompt the user to connect the appropriate peripheral if it is not already. A thief who steals the system while the user is "out and about" would not have at his disposal these peripherals to assist in recovering these stored passwords and credentials, and would thus be unable to use this approach to recover data from the system. The number of credentials stored in the peripheral is limited only by the storage capacity of the peripheral. In one aspect, the peripheral can include removable storage, such as a flash memory card, to expand the storage. The removable storage can then be transferred to different power adapters, backed up, duplicated, and so forth.

In one aspect, the password recovery secrets stored in a peripheral can be tied to a biometric or other authentication. For example, when the user desires to restore the password using the password recovery secret, the power supply can require a fingerprint scan on the power supply itself or on the computer. In another example, when the user desires to restore the password, the computer retrieves a first part of the password recovery secret from the power supply and a second part of the password recovery secret from a secure server over a network. This example is explained in more detail in FIG. 7.

When the computer detects that a user with a password has connected a peripheral, the computer can poll the peripheral first to determine if the peripheral is able to store credential recovery information. The computer can then poll the peripheral to determine if the peripheral has any stored credential secrets for that computer. If the peripheral does not, the computer can prompt the user, via a display or other human interface device, to back up at least one password on the peripheral device. The computer then generates a password recovery secret associated with the computing device, the user, and/or the user password, and transmits the password recovery secret to the peripheral device for storage in memory of the peripheral device.

Figure 3:
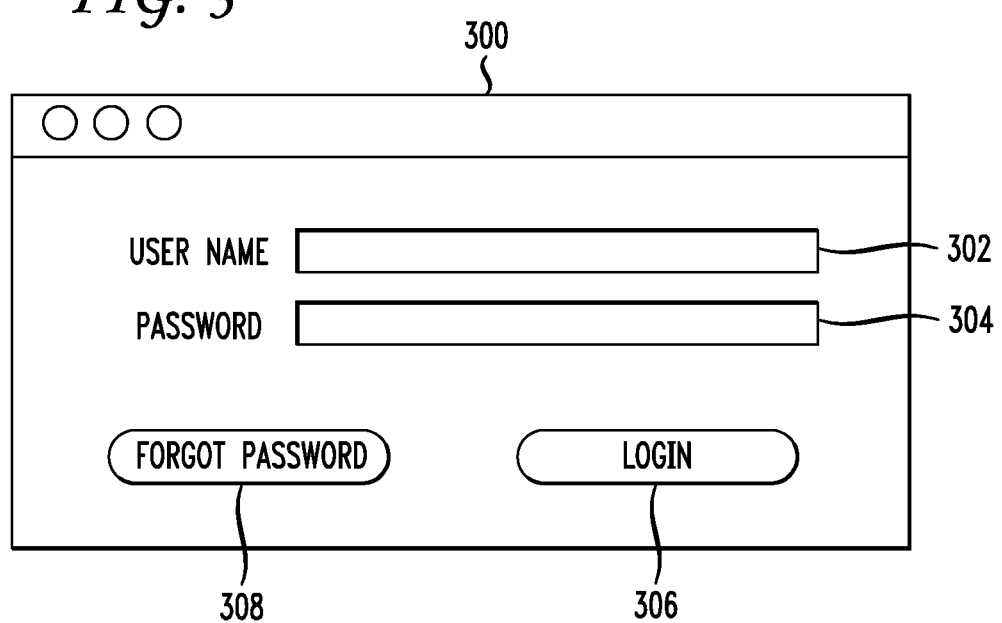
FIG. 3 illustrates a first example user interface dialog.

FIG. 3 illustrates a first example user interface dialog 300 for when a user forgets a computer system password which has been stored on a peripheral. In this example, the peripheral is a power adapter and the password is part of a system credential. The dialog 300 includes elements such as a text entry field for a username 302 and a password 304. After entering the username and password, the user can click the "login" button 306. However, if the user has forgotten the username and/or the password, the user can click the "forgot password" button 308.

Figure 4:
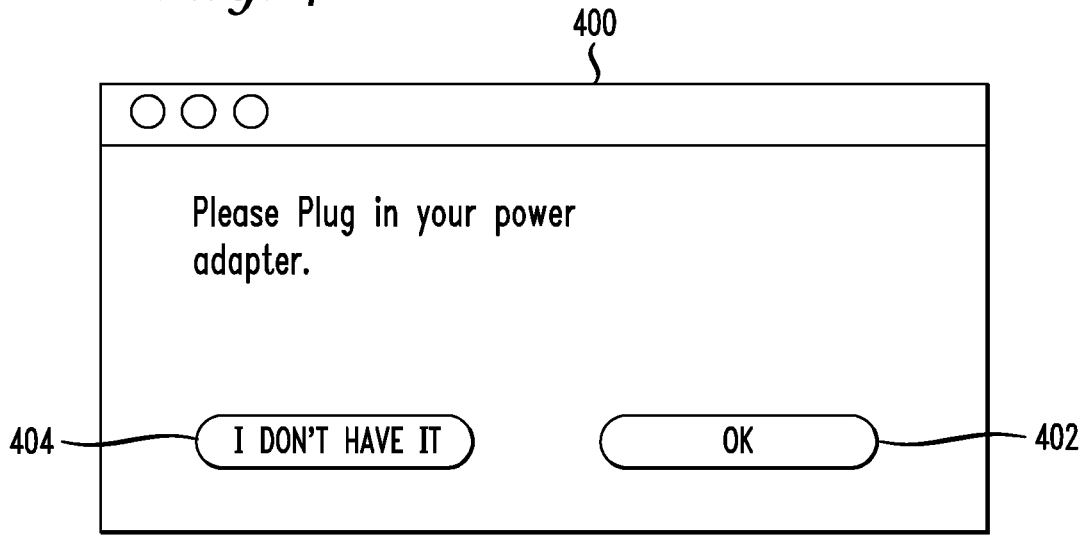
FIG. 4 illustrates a second example user interface dialog.

After clicking the "forgot password" button 308, the system looks for the power adapter 204 with the stored password recovery information. If the power adapter is not attached, the system displays a dialog 400 as shown in FIG. 4. The dialog 400 prompts the user to plug in the power adapter and click the "OK" button 402. If the user does not have the power adapter, the user clicks the "I don't have it" button 404 and proceeds to an alternative peripheral with the stored password recovery information or to an alternative approach for password recovery. The system then requests the password recovery secret from the memory of the peripheral device, receives the password recovery secret from the memory of the peripheral device, and recovers the password based on the password recovery secret.

Figure 5:
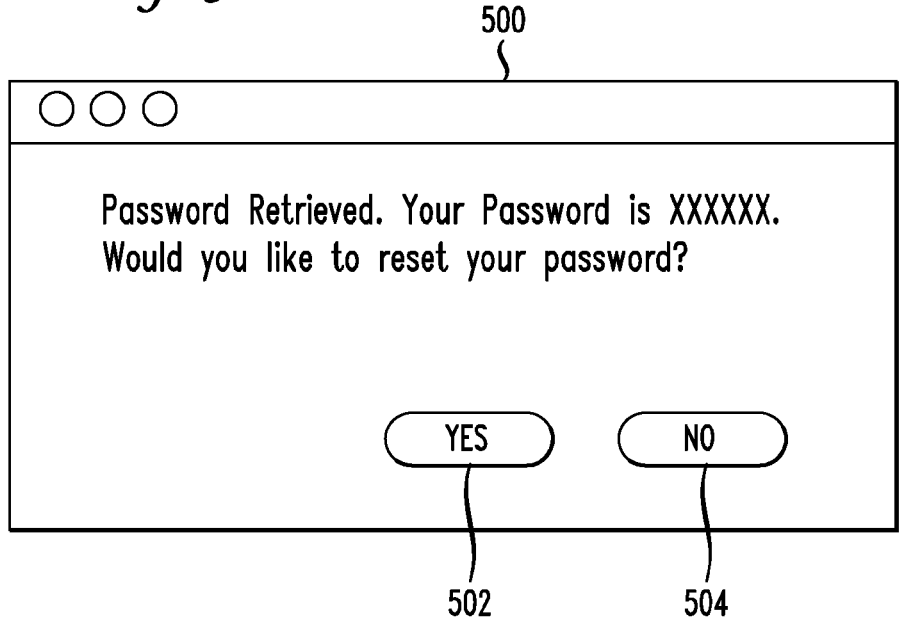
FIG. 5 illustrates a third example user interface dialog.

After the user clicks the "OK" button 402 or if the system detects that the power adapter 204 is already connected, the system displays the dialog 500 as shown in FIG. 5. The dialog 500 can include the user password. In one aspect, the dialog 500 asks if the user wants to reset the password, to which the user can click the "yes" button 502 or the "no" button 504. In one variation, the system automatically logs in for the user. In another, after each successful password recovery, the system forces the user to reset the password, generates a new password recovery secret, and stores the new password recovery secret on the power adapter. In another variation, the dialog 500 does not show the recovered password, but instead shows a password hint, so that a thief who steals both a laptop and its power adapter, for example, can only recover the password hint and not the actual password.

Figure 6:
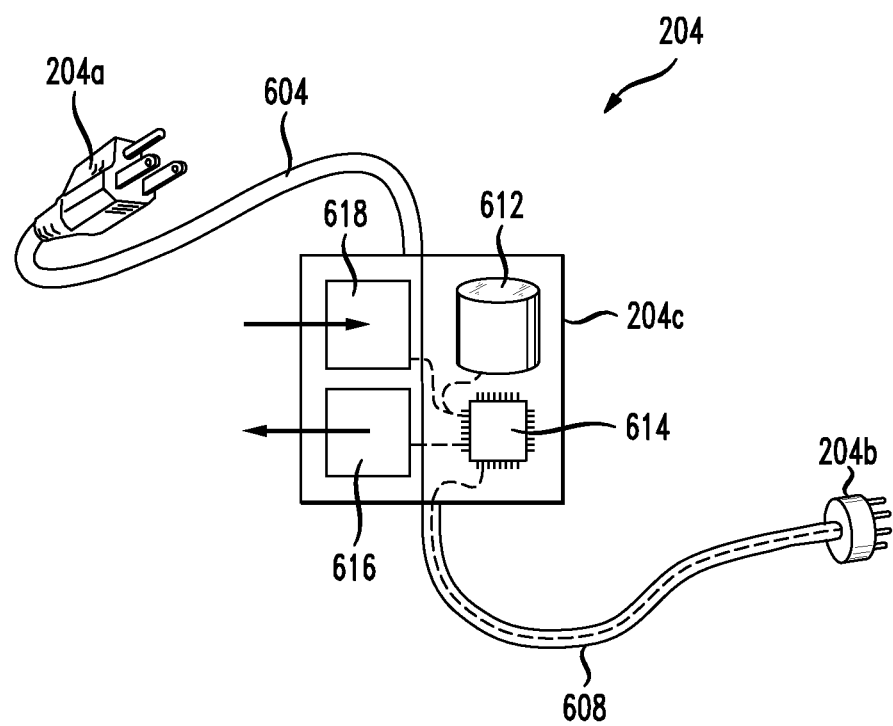
FIG. 6 illustrates an example power adapter and exemplary internal components.

FIG. 6 illustrates an example power adapter 204 and exemplary internal components. Similar approaches can be implemented in different peripherals in a manner tailored to that type of peripheral. The power adapter 204 includes a first interface 204a connecting to an electrical source, a second interface 204b connecting to an electronic device such as a computer, and an intermediate module 204c that adapts, for example, alternating current to direct current and provides a proper amount of voltage and current for the electronic device. The first interface 204a connects to the intermediate module 204c via an electrical connection 604, while the second interface 204b connects to the intermediate module 204c via a combination interface 608 that includes an electrical connection and a data connection, as indicated by the dashed line. The data connection is a third interface that connects the computer with a memory 612, storage, or database in the power adapter 204. The computer can read and write credential recovery secret data to the memory 612 via the data connection. The memory 612 can store recovery secrets in plain text format, in an obfuscated format, or an encrypted format. In one aspect, the recovery secret is data which is meaningless without the use of some companion data on the associated computer to understand or complement the recovery secret.

The intermediate module 204c can optionally include a processor 614 to facilitate access to the memory 612, but can function without a processor 614. For example, the power adapter can simply serve as secure mass storage which does not provide its own processing power and must be accessed using processing power of the attached computer. The intermediate module may include a small battery or other internal power source to maintain the memory contents if the memory requires electricity, or to provide access to the password recovery secret when the first interface 204a is not plugged in to an electrical power source.

The intermediate module 204c can optionally include a fourth input/output interface 616, 618 for diagnostics, resetting the memory 612, reading the memory 612, and performing other operations on elements of the power adapter 204. The input/output interface 616, 618 can be a two-way data connection, such as a wired or wireless connection to a display and input device, or it can be a user interface directly incorporated as part of the intermediate module 204. The input/output interface 616, 618 can be any suitable wired or wireless connector, such as serial, parallel, universal serial bus (USB), IEEE 1394 (Firewire), external serial ATA (eSATA), Ethernet, and other yet-to-be developed or proprietary connectors. The storage 612, processor 614, input/output interface 616, 618, and other components can be placed or incorporated anywhere within or on the power adapter 204, and are not limited to placement in the intermediate module.

Figure 7:
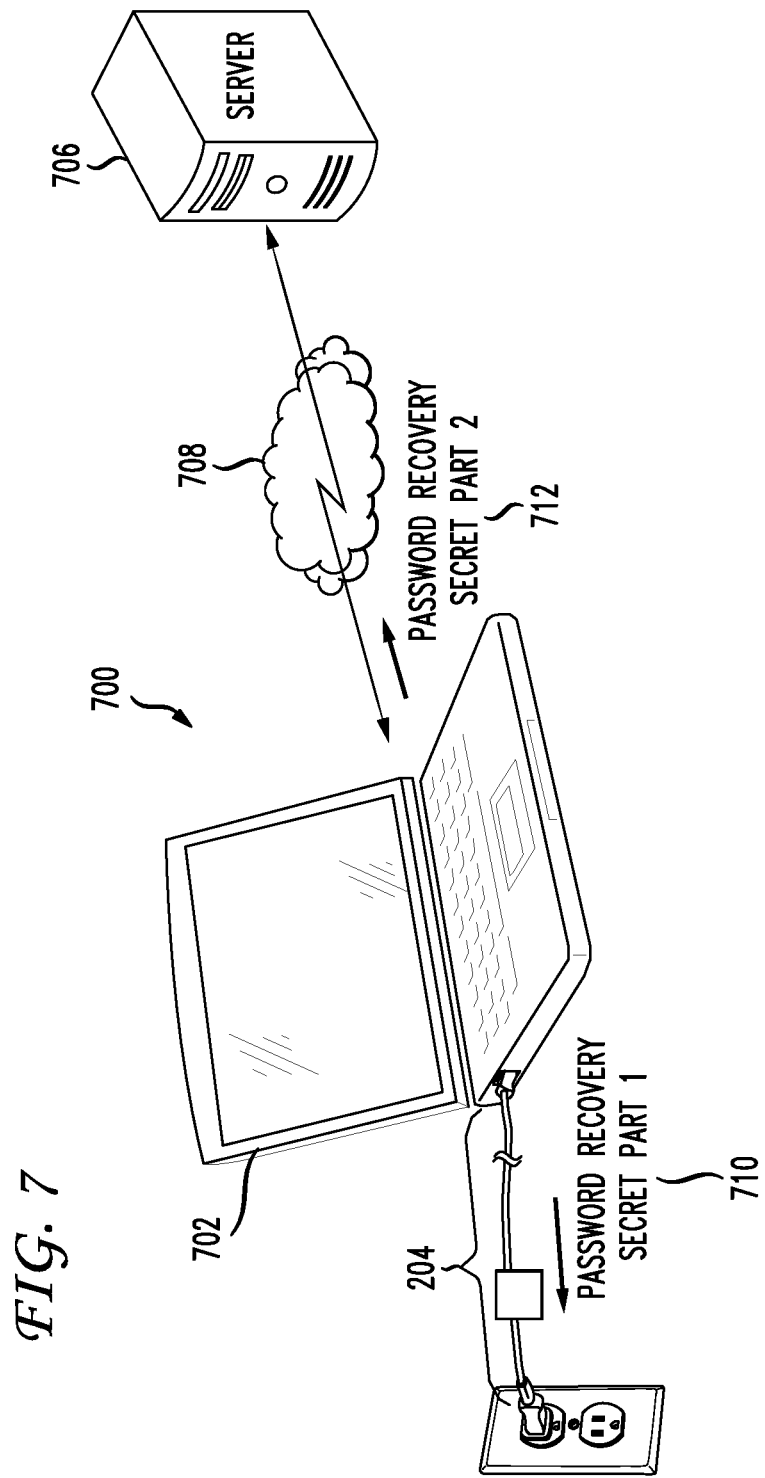
FIG. 7 illustrates an example of storing a password recovery secret on a peripheral and on a server.

FIG. 7 illustrates an example 700 of storing a password recovery secret on a peripheral and on a server. In this variation, a user creates a password recovery secret on computer 702. The computer stores a first part 710 of the password recovery secret on a power adapter 204 or other peripheral and a second part 712 of the password recovery secret on a server 706 accessible over a network 708. In one embodiment, both parts 710, 712 of the password recovery secret are required to recover a lost or forgotten password. In another embodiment, the parts 710, 712 are asymmetric such that the first part 710 requires the second part 712 to recover the password, but the second part 712 is sufficient to recover the password by itself. In two-part credentials, such as a username and a password, the password is stored in the power adapter 204 and the username is stored in the server 706. These and other variations exist which can be tailored to specific use and security scenarios.

Figure 8:
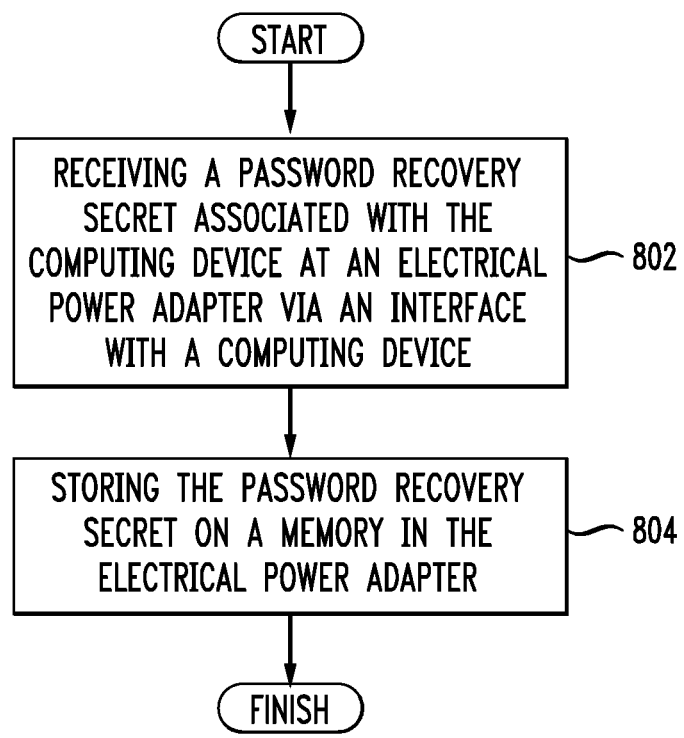
FIG. 8 illustrates a first example method embodiment.
Figure 9:
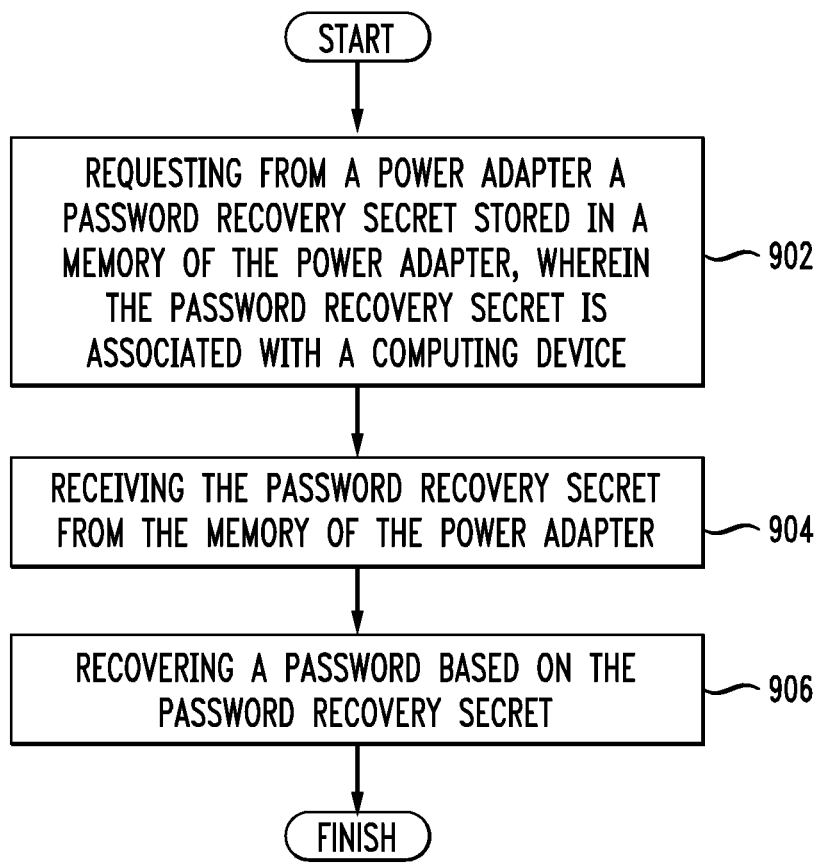
FIG. 9 illustrates a second example method embodiment.

Having disclosed some basic system components, the disclosure now turns to the exemplary method embodiments shown in FIGS. 8-10. For the sake of clarity, the methods are discussed in terms of an exemplary system such as is shown in FIG. 1 configured to practice the methods. FIG. 8 illustrates a first example method embodiment for storing a password recovery secret on a peripheral such as a power adapter. The system 100 receives a password recovery secret, optionally associated with the computing device, at an electrical power adapter 204 via an interface with the computing device (802). The interface can also provide electricity adapted from an external electrical source to the computing device. The password recovery secret can be an encrypted universal unique identifier (UUID) associated with the computing device. For example, a manufacturer of portable electronic devices can embed a unique identifier in each of the devices. Then each device can use its own unique identifier to generate, via an encryption algorithm, the password recovery secret.

The system 100 stores the password recovery secret on a memory in the electrical power adapter (804). The password recovery secret can be associated with at least part of a password keychain.

FIG. 9 illustrates a second example method embodiment for recovering a password recovery secret stored on a power adapter. The system 100 requests from a power adapter a password recovery secret stored in a memory of the power adapter (902). The password recovery secret can be associated with an encrypted file system, a user password, and/or other credentials. When the peripheral is a power adapter, the system 100 can request the password recovery secret via a main electrical power interface. The system 100 then receives the password recovery secret from the memory of the power adapter (904). The system can also request the password recovery secret from one or more other peripheral devices such as a printer, router, external monitor, and so forth.

The system 100 recovers a password based on the password recovery secret (906). The system 100 can further verify the received password recovery secret with an authentication server 706. The system 100 can, after recovering the password, grant access to resources protected by the password. For example, when the password recovery secret is associated with an encrypted file system, the system 100 can further decrypt at least part of an encrypted file system based on the password recovery secret.

FIG. 10 illustrates a third example method embodiment for prompting a user to store a password recovery secret on a peripheral device 114. The system 100 detects that a peripheral device has been connected to a computing device (1002) and determines whether the peripheral device has a stored password recovery secret associated with the computing device (1004). The peripheral device can include multiple password recovery secrets for one or more device, user, resource, or application. The system 100 can then prompt a user to back up at least one password on the peripheral device (1006). The system 100 generates a password recovery secret associated with the computing device (1008) and transmits the password recovery secret to the peripheral device for storage in memory of the peripheral device (1010).

As a real world example, a smartphone stores password recovery information on a synced computer as a peripheral. If the smartphone is lost or stolen, the password can only be retrieved when the smartphone is paired with the synced computer. In another example, a tablet computing device stores password recovery information via an 802.11 wireless connection on a printer as a peripheral. If the tablet computing device is stolen or lost, the password can only be retrieved when the tablet computing device is on the same wireless network as the printer.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein are applicable to storing and recovering operating system logins, smartphone unlock codes, banking website credentials, and so forth. Those skilled in the art will readily recognize various modifications and changes that may be made to the principles described herein without following the example embodiments and applications illustrated and described herein, and without departing from the spirit and scope of the disclosure.

I claim:

1. A computing device configured to recover a password using a password recovery secret, the computing device comprising:
a processor configured to cause the computing device to:
retrieve, via an interface included in a peripheral device that is configured to provide electricity adapted from an external electrical source to the computing device, a first part of the password recovery secret stored in a memory of the peripheral device, wherein the password recovery secret is encrypted using a key comprising a universal unique identifier associated with the computing device;
retrieve a second part of the password recovery secret from a secure server over a network; and
recover the password using each of the first part and the second part of the password recovery secret.

2. The computing device of claim 1, wherein the processor is further configured to verify the password recovery secret with an authentication server.

3. The computing device of claim 1, wherein the password recovery secret is associated with an encrypted file system, and the processor is further configured to decrypt at least part of an encrypted file system based on the password recovery secret.

4. The computing device of claim 1, wherein:
the computing device further comprises a biometric authentication device, and
the processor is further configured to:
authenticate a user using the biometric authentication device; and
retrieve the first part of the password recovery secret from the memory of the peripheral device via the interface in response to successfully authenticating the user.

5. The computing device of claim 4, wherein the biometric authentication device includes a fingerprint scanner, and the biometric authentication device is configured to authenticate the user via the fingerprint scanner.

6. A non-transitory computer-readable storage medium configured to store instructions that, when executed by a computing device, cause the computing device to prompt a user to store a password recovery secret on a peripheral device, by carrying out steps that include:
detecting that a peripheral device has been connected to the computing device; and
when the peripheral device does not store the password recovery secret associated with the computing device:
prompting a user, via a display, to back up at least one password on the peripheral device;
generating, by encrypting the at least one password using a key comprising a universal unique identifier, the password recovery secret associated with the computing device; and
transmitting the password recovery secret to the peripheral device for storage in a memory of the peripheral device.

7. The non-transitory computer-readable storage medium of claim 6, wherein the computing device retrieves a first part of the password recovery secret from the peripheral device via an interface with the computing device, and retrieves a second part of the password recovery secret from a secure server over a network.

8. The non-transitory computer-readable storage medium of claim 6, wherein the peripheral device is configured to store a plurality of password recovery secrets each associated with a different computing device.

9. The non-transitory computer-readable storage medium of claim 6, wherein the password recovery secret is associated with at least part of a password keychain.

10. The non-transitory computer-readable storage medium of claim 6, wherein the steps further include verifying the password recovery secret with an authentication server.

11. A peripheral device comprising:
a memory;
a biometric authentication device configured to authenticate a user;
a first interface configured to connect to an electrical source;
a second interface configured to communicate a password recovery secret from the memory to a computing device in response to successful authentication of the user by the biometric authentication device;
a third interface connected to the memory through which the password recovery secret associated with the computing device is received for storage in the memory, wherein the password recovery secret is used to retrieve a user password; and
an intermediate module to adapt electricity from the electrical source for the computing device.

12. The peripheral device of claim 11, wherein the password recovery secret is generated by encrypting the user password using a key comprising a universal unique identifier associated with the computing device.

13. The peripheral device of claim 11, wherein the biometric authentication device comprises a fingerprint scanner, and the biometric authentication device is configured to authenticate the user using the fingerprint scanner.

14. The peripheral device of claim 11, wherein the password recovery secret is retrieved via the third interface.

15. The peripheral device of claim 11, wherein the second interface and the third interface share a same physical connector.

16. The peripheral device of claim 11, wherein the third interface is one of serial, parallel, universal serial bus (USB), IEEE 1394 (Firewire), external serial ATA (eSATA), and Ethernet.

17. The peripheral device of claim 11, wherein the memory is a removable memory media.

* * * * *

UNITED STATES PATENT AND TRADEMARK OFFICE
CERTIFICATE OF CORRECTION

| | |
|---|---|
| PATENT NO. | : 8,949,971 B2 |
| APPLICATION NO. | : 13/763419 |
| DATED | : February 3, 2015 |
| INVENTOR(S) | : Guy Leslie Tribble |

Page 1 of 1

It is certified that error appears in the above-identified patent and that said Letters Patent is hereby corrected as shown below:

In the Claims:

Column 11, line 33 (Claim 3, line 4): "an encrypted" should read -- the encrypted --.

Column 11, line 54 (Claim 6, line 6): "a peripheral" should read -- the peripheral --.

Signed and Sealed this
Twenty-third Day of June, 2015

Michelle K. Lee
*Director of the United States Patent and Trademark Office*